United States Patent [19]
Zipin

[11] 3,748,043
[45] July 24, 1973

[54] PHOTOELECTRIC INTERPOLATING ARRANGEMENT FOR READING DISPLACEMENTS OF DIVIDED SCALES

[75] Inventor: Richard B. Zipin, Englewood, Ohio
[73] Assignee: The Bendix Corporation, Southfield, Mich.
[22] Filed: Mar. 20, 1972
[21] Appl. No.: 236,005

[52] U.S. Cl. .............. 356/170, 356/171, 250/220 R
[51] Int. Cl. .......................................... G01b 11/04
[58] Field of Search .................. 356/170, 171, 172; 250/220 R, 237

[56] References Cited
UNITED STATES PATENTS

| | | |
|---|---|---|
| 3,591,841 | 7/1971 | Heitmann .................... 250/220 R X |
| 3,533,703 | 10/1970 | Wingate ............................. 356/170 |
| 3,529,170 | 9/1970 | Russell .......................... 356/170 X |
| 3,388,262 | 6/1968 | Stutz ............................. 356/170 X |
| 3,369,444 | 2/1968 | Patrignani ......................... 356/170 |

Primary Examiner—David Schonberg
Assistant Examiner—Paul K. Godwin
Attorney—John R. Benefiel et al.

[57] ABSTRACT

An arrangement is disclosed for providing interpolation between readouts of displacements of a divided scale with respect to a reference location in a reading system which includes photosensing and counting of magnified images of scale graduations relatively moving with respect to the reference location. This arrangement accomplishes interpolation between counts of successive graduations by means for projecting an image of a series of scale graduations onto a series of photosensors which have a vernier spacing relationship with the series image so that the particular photosensor in the series registering with a graduation image provides an indication of the fractional displacements of the scale relative to the reference location.

3 Claims, 2 Drawing Figures

PATENTED JUL 24 1973 3,748,043
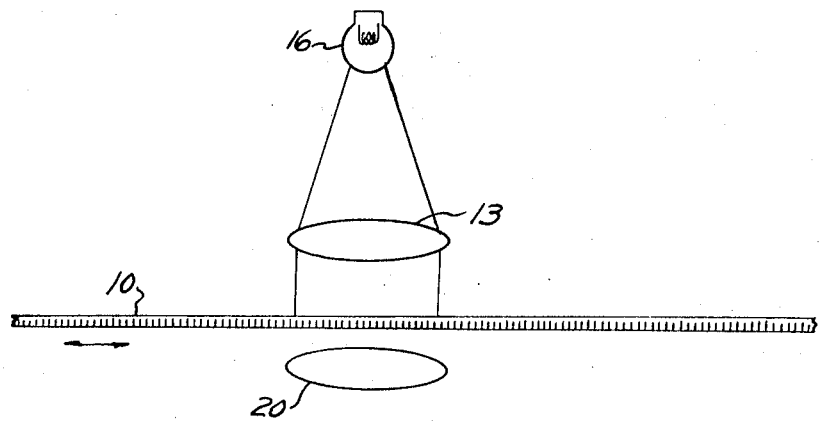
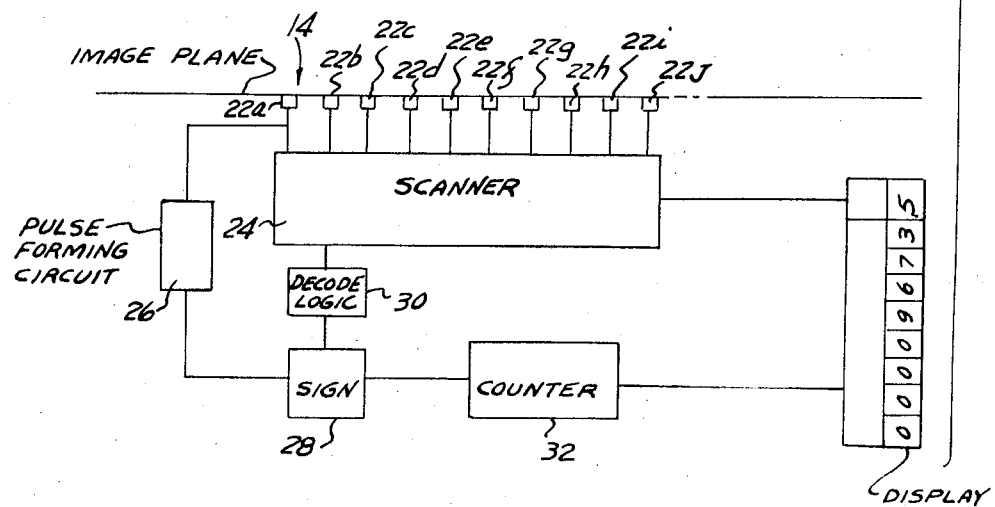
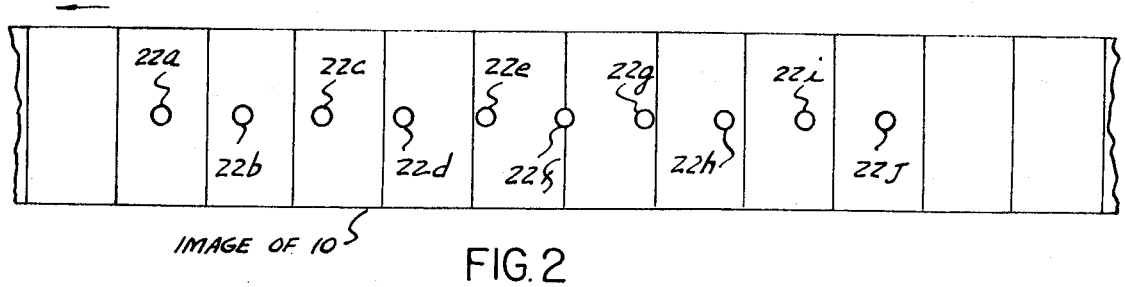
FIG. 1
FIG. 2

PHOTOELECTRIC INTERPOLATING ARRANGEMENT FOR READING DISPLACEMENTS OF DIVIDED SCALES

BACKGROUND OF THE INVENTION

1. Field of the Invention

This invention concerns arrangements for reading of displacements of graduated scales, and more particularly arrangements wherein a digital readout of the relative displacements of scale is produced.

2. Description of the Prior Art

Arrangements wherein a graduated scale is "read" by photosensing of the magnified images of the graduations as they are displaced relative to a reference location and which are counted to provide an electronic readout of the resulting relative scale position are known in the prior art, as exemplified by U.S. Pat. No. 3,369,444 to Patrignani. In these arrangements, resolution of the system could of course be improved if some means for interpolating between successive graduations was included. In Patrignani, there is disclosed an optical type interpolation, in which the image of the particular graduation being read is successively projected on photosensors, and the counted number of electrical pulses so generated is utilized to provide an interpolation reading. However, this system as disclosed depends on a count of pulse signals and in this sense is "dynamic" in that a continuing signal corresponding to the fractional displacements of the scale is not generated, as opposed to a "static" system in which a continuously generated signal corresponding to the fractional position is provided. Such static systems are generally more reliable as counts may be lost in a dynamic system and subsequent readings are then rendered erroneous. Other complicating design factors, such as sign logic is necessitated by a dynamic system.

Therefore, it is an object of the present invention to provide an interpolation arrangement for such a system which provides a static signal indicative of relative displacements of the scale and reference location which are fractions of the graduation spaces.

SUMMARY OF THE INVENTION

This and other objects which will be understood after a reading of the following specification and claims is accomplished by an arrangement for projecting an image of a series of scale graduations onto a series of photosensors which have a vernier spacing relationship with the series image so that the particular photosensor in the series registering with a graduation provides an indication of relative displacements of the reference location and the scale which are fractions of said graduation spaces.

DESCRIPTION OF THE DRAWINGS

FIG. 1 is a diagrammatic representation of an arrangement according to the present invention.

FIG. 2 is a view of the projected scale image as it appears in relation to the photosensor series depicted diagrammatically in FIG. 1.

DETAILED DESCRIPTION

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Referring to the Drawing and particularly FIG. 1, a graduated scale taking the form of a grating 10 is shown which is arranged to be displaced relative to a reference location at which is placed an image forming apparatus and image reading apparatus 14. The grating 10 in this embodiment may comprise either opaque graduations on a transmitting background or transmitting graduations on an opaque background as described in the aforementioned patent.

Alternatively, a reflecting rather than a transmitting grating may be utilized, but the image reading and producing apparatus would of necessity be of different design; i.e., utilizing beam splitters, etc.

In typical applications, the grating 10 may be connected to a carriage structure (not shown) mounted to move past the image forming apparatus and reading apparatus 14, so that a reading of the relative grating position will provide an indication of travel of the carriage, for uses such as machine tools and coordinate inspection machines.

The image forming apparatus includes a light source 16 and a collimating lens 13 arranged to project direct parallel rays of light through the grating 10. The resulting light pattern is then magnified by an objective lens 20 to form an enlarged image of the grating pattern in the plane indicated in FIG. 1.

A series of photosensors 22 are arranged aligned and parallel with the grating 10 with the light sensitive surfaces thereof lying in the image plane, so that the magnified light and dark grating pattern is superimposed thereon.

According to the present invention the degree of magnification provided by the objective lens 20 is selected so that the image of N-units of the graduations just occupy the linear space occupied by $N + 1$ photosensors 22, $N + 1$ being the actual number of photosensors utilized. It can be appreciated that this arrangement creates a vernier relationship between the series of photosensors 22 and the image of the grating 10 pattern in the image plane. That is, if the first in the series photosensors 22 is not aligned with an image of a graduation, but rather is in an intermediate position between successive graduation images, the successive photosensor 22 in the series 22b through 22j which is aligned with a graduation image indicates the fractional displacement of the first photosensor 22 past a graduation image. The value of this fraction depends on the number of photosensors 22, and in order to provide a decimal indication, the number of photosensors 22 is shown in FIG. 1 as 10. Accordingly the objective lens 20 enlarges the grating 10 pattern so that the image of nine graduations just occupies the linear space of the series of ten photosensors 22.

With this design, as each photosensor 22b through 22j successively registers with a graduation image, an indication of the position of the lead photosensor 22 is provided at increments of tenths of the space between graduations.

This effect can be more clearly appreciated by reference to FIG. 2. The lead photosensor 22a is intermediate a pair of graduation images while the fifth photosensor 22f is aligned with a graduation image, indicating the lead photosensor 22a is positioned five-tenths of a graduation space between the pair of graduation images. As relative displacement continues, photosensors 22g through 22j successively align themselves with graduation images, with the alignment of 22j indicating a position of photosensor 22a nine-tenths across the space between the pair of graduation images, until the lead photosensor 22a again becomes aligned with a successive graduation image.

In connection with the triggering of the photosensors 22 by either shading (in the case of opaque graduations) or illuminating (in the case of an opaque background) it is of course as essential that proper masking, sizing, etc., and other design principles involved in this application of photosensors be adhered to so that "clean" triggering is produced; i.e., only a single photosensor aligned with a graduation image is changed from its high to low state (or vice versa).

A system for utilizing the information thus generated is depicted in block diagram form in FIG. 1.

This would include a scanning circuit 24, providing an indicating means of the condition of the photosensors 22; i.e., which photosensor 22 is aligned with a scale image and thus in its triggered state.

Also included would be an arrangement for counting the number of state changes of the lead photosensor 22a. Preferably this would involve a pulse forming circuit 26, a sign gating circuit 28, controlled by a logic circuit 30, and pulse counter circuitry 32. In connection with the sign gating 28, it can be appreciated that the direction of successive alignments of the photosensors 22b through 22j indicates the direction in which the lead photosensor 22a is crossing a given graduation image so that by the use of proper logic circuitry combinations, the sign of a given pulse produced by a registration of photosensor 22a can be determined, and is thus either added or subtracted in the counter 32.

Both the reading of the scanner 24 and the counter 24 are displayed in a display 34, such that the least significant digit indicating tenths of graduations is supplied by the scanner 24, while whole values thereof indicated by the display of the count contained in Counter 32.

Since suitable circuitry scanners and display devices are well-known in the art, it is not felt necessary to here include specifics of these, and such details are omitted in the interest of clarity.

Thus, it can be seen that a static signal of the least significant digit representing fractional displacements between graduations in the grating 10 has been provided, to provide the advantages described above.

Many other modifications and alternatives are of course possible within the spirit of the invention, as for example, rather than a grating scale, fringe patterns can be interpolated in the same fashion.

Similarly, the various parameters can be adjusted to increase the magnification of the scale to allow reading of scales of more closely spaced graduations to improve the overall sensitivity of the system to increments of linear travel.

Therefore, what is claimed is:

1. An interpolating arrangement for a system of reading displacements of divided scales which includes means for photosensing and counting of images of scale graduations relatively moving with respect to a reference location, the arrangement comprising:

a series of photosensing means;

image forming means for projecting an image of a series of scale graduations onto and aligned with said series of photosensing means;

said image of said series of scale graduation image being such that N scale graduation images along said series just occupies the space of $N + 1$ of said photosensing means along said series;

indicating means for indicating the particular photosensing means in said series aligning with a graduation image, whereby fractional displacements of said scale images relative said reference location are indicated by the particular photosensor means aligned with said graduation image.

2. The arrangement of claim 1 wherein said series of photosensing means comprises ten photosensor means and wherein said image forming means projects an image of said series of scale graduations such that nine of said scale graduation images just occupies the space of said ten photosensors, whereby said fractional positions in tenths is provided.

3. The arrangement of claim 2 wherein said system of reading relative displacement of scales includes means counting registrations of one of said photosensor means with scale images, and means for displaying said count, and wherein said indicating means includes means displaying said fractional diplacements together with said count display whereby a decimal display of the relative displacement of said scale and reference location is provided.

* * * * *